Nov. 13, 1934.    H. F. CALLAHAN    1,980,572
ELECTRON DISCHARGE DEVICE AND METHOD OF MANUFACTURING
Filed July 25, 1933
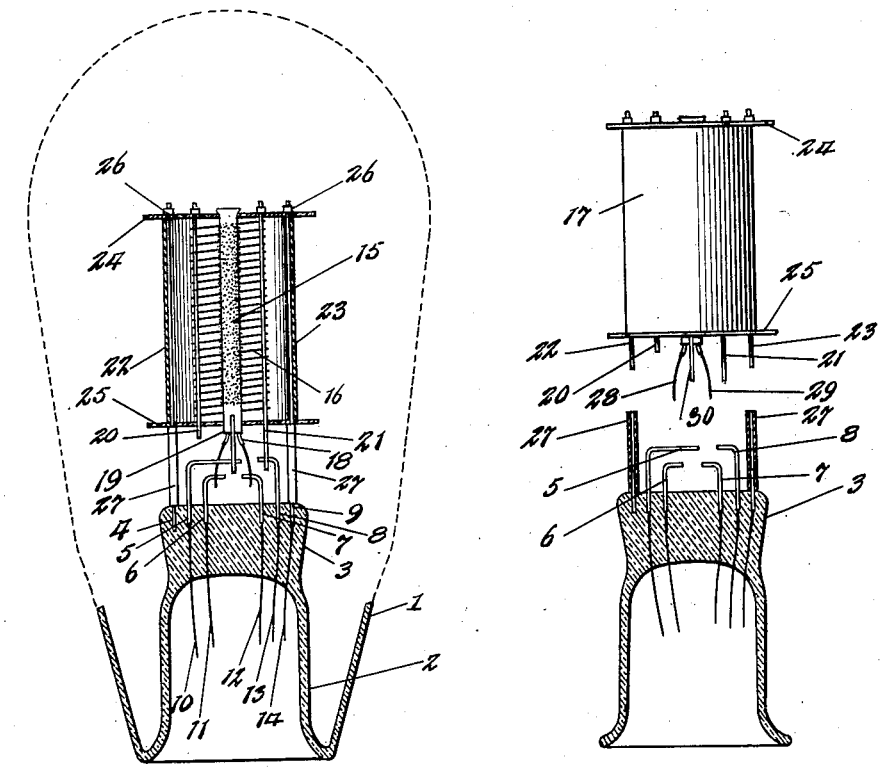
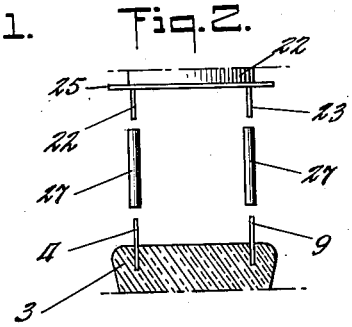
Fig.1.   Fig.2.   Fig.3.
Henry F. Callahan
INVENTOR
BY  John J. Rogan
ATTORNEY Patented Nov. 13, 1934

1,980,572

UNITED STATES PATENT OFFICE 1,980,572

ELECTRON DISCHARGE DEVICE AND METHOD OF MANUFACTURING

Henry F. Callahan, Salem, Mass., assignor to Hygrade Sylvania Corporation, Salem, Mass., a corporation of Massachusetts Application July 25, 1933, Serial No. 682,074

2 Claims. (Cl. 250—27.5)

This invention relates to discharge tubes, and with particularity to an improved tube structure and method of assembly thereof.

An object of the invention is to provide an improved construction of electric discharge tube, whereby such tubes or the like may be assembled expeditiously by hand and are rendered capable also of accurate machine assembly.

Another object of the invention is to provide an improved manner of mounting and supporting the electrode assembly of an electric discharge tube, whether of the vacuum or gas-filled type.

Heretofore, in the manufacture of such devices as radio tubes or the like, it has been the customary practice to support the electrode assembly from the press or stem by means of support wires which are sealed into the press. The combined stem with its sealed-in support wires, and the electrode assembly, is usually referred to in the art as a mount. The various electrodes have also been provided with respective projections or posts which are adapted to register with corresponding support wires to which they are fastened usually by welding. It has been found that with these prior art structures, if the various electrode posts are not in perfect alignment with the associated support wires, the finished tube may have the electrode assembly positioned at an angle with respect to the vertical axis of the tube, not only rendering the tube unsightly, but also subjecting the press to unequal strains. In order to expedite the assembly operation of these prior art structures, it has been found necessary to overlap the electrode posts with respect to the associated support wires, so as to facilitate the welding which has been effected heretofore manually. As a result of this overlapping, particularly in connection with the plate posts, there is a pronounced weakening of the electrode support, so that excessive jars may cause the support to bend adjacent the weld. Furthermore, with the prior art method of assembling, the operator could only determine the alignment and spacing of the various electrodes after these electrodes had been finally fastened to the support wires leading from the press. With this prior art arrangement, therefore, it was very difficult for the operator to look down through the electrode assembly to ascertain the proper alignment of the electrodes, particularly as regards that portion of the assembly adjacent the press.

Accordingly, one of the important features of this invention resides in improved means for fastening and supporting an electrode assembly whereby the above noted and other disadvantages are overcome.

Another feature of the invention relates to the means for uniting the electrode assembly telescopically or in a similar manner to the press.

A further feature relates to an improved structure, whereby the electrode assembly may be completely aligned and assembled on the stem before completing the fastening of the various support wires to the electrode posts.

A further feature relates to a tube structure wherein part of the strain, due to the vibration of the electrode assembly, is borne by the edge of the press rather than by that portion of the press wherein the support wires are sealed.

A further feature resides in a tube structure whereby the exposed support means between the electrode assembly and the press is of greater diameter than the "sealed-in" portion, thus increasing the mechanical strength of the supports and also reducing the chances of leakage.

A still further feature relates to the novel organization, arrangement and relative arrangement of parts whereby more uniform and efficient discharge tubes may be made.

Other features and advantages not specifically enumerated will be apparent after a consideration of the following detailed description and the appended claims.

While the invention will be disclosed herein as embodied in a three-electrode tube of known type, it will be understood that this is done merely for illustrative and explanatory purposes and therefore the invention may be embodied in so-called tetrodes, pentodes, etc., either of the vacuum or gas or vapor-filled type, without departing from the contemplated spirit and scope of the invention.

Accordingly, in the drawing Fig. 1 is an elevational view, partly in section, of a tube structure according to the invention;

Fig. 2 is a schematic view showing a step in the assembly of the tube of Fig. 1; and Fig. 3 illustrates another step in the assembly of the tube.

Referring more particularly to Fig. 1, the numeral 1 indicates the bulb or envelope such as ordinarily employed in radio tubes or the like. United to the bulb 1 is a re-entrant stem 2 which terminates in a press 3 into which the various support wires 4, 5, 6, 7, 8 and 9 are sealed.

In accordance with the usual practice, the wires 5, 6, 7, 8 and 9 are welded to the respective lead-in wires 10 to 14, the latter being preferably of a material having substantially the same coefficient of expansion as the material of the press. As shown more clearly in Figs. 2 and 3, the support wires 4 and 9 are "sealed-in" in substantially the same plane, with the exception of the horizontal portion of wire 5 which is bent out of the plane of the remaining wires for purposes about to be described.

The electrode assembly may comprise an electron emitting cathode 15, a grid 16, and an anode or plate 17. The cathode 15 may be of any well-known indirectly heated type and may, if desired, be of the structure disclosed in the copending application of George D. O'Neill, Serial No. 620,157, filed June 30, 1932. Thus, as indicated in the drawing, the cathode may consist of an insulated heater wire 18 bent back upon itself and inserted within the metallic sleeve 19. Sleeve 19 may be pinched at its upper end, and is provided with a coating 20 of electron emissive material. It will be understood, of course, that the invention is not limited to a tube having an indirectly heated cathode, and therefore a filamentary or any other known type of cathode may be employed.

Surrounding the cathode 15 is the grid 16 which may consist of any kind of foraminous material. Thus, as shown in the drawing, grid 16 comprises a pair of metallic posts 20, 21, around which the grid wire 16 is helically wound. Preferably, the individual turns of the grid wire are welded, swaged, or otherwise fastened to the posts 20, 21. Post 20 may be fore-shortened with respect to the post 21 if it is desired to complete the electrical connection to the grid through only one post. If desired, the post 20 may be omitted entirely and reliance placed on post 21 to support and contact with the various grid turns.

Surrounding the cathode and grid is the plate or anode 17 which may be in the form of a cylindrical metal sheet which is attached to a pair of posts 22, 23. It will be understood, of course, that any well known form of plate or anode may be employed. Instead of using sheet material for this purpose, a wound wire, a foraminous member or the like, may be employed. For the purpose of accurately spacing the various electrodes from one another, there are provided two insulator members 24, 25; through which the various electrode rods 20, 21, 22, 23 project. Suitable beads or enlargements 26 may be provided on the posts 22, 23 to prevent the insulator member 24 from falling out of place. If desired, the upper ends of the posts 20 and 21 may likewise be enlarged to support the grid. Likewise, the upper end of the cathode sleeve 19 may be pinched so that the pinched portion is slightly larger than the perforation in the member 24 through which the cathode passes. It will be understood, of course, that the insulator member 24 is provided with openings of the proper size and with the proper spacings therebetween to receive the members 20, 21, 22, 23 and 19. The lower insulator 25 is provided with openings corresponding to those in the upper member 24. There is thus provided what may be termed a unitary electrode assembly, wherein the various electrodes are supported as a unit and are accurately spaced from one another by means of the insulator members 24 and 25. The manner of assembling the electrodes to form the electrode unit may be in accordance with any well-known procedure. For example, the lower ends of the posts 20, 21, 22, 23 and the cathode sleeve 19, may be positioned in a suitable jig to enable the operator to properly align the electrodes. When the alignment has been attained, the insulator member 24 may be positioned over the upper ends of the said posts, preferably so that the insulator member 24 rests against the uppermost turn of the grid, after which the posts 22 and 23 may be provided with enlargements or beads 26 to hold the member 24 in place. At this time also the upper end of the cathode sleeve may be pinched for the same purpose. With the electrode assembly thus aligned, the operator removes the said assembly from the jig and then positions the insulator member 25 in place.

The next step in the assembly operation is to position a small metal sleeve 27 over each of the supports 4 and 9, as indicated in Figs. 2 and 3. Preferably, the sleeves or tubes 27 are positioned so that their lower edges are in contact with the edge of the press. The next step in the assembly operation is to move the electrode assembly so that the lower ends of the posts 22 and 23 enter the openings in the sleeves 27. If desired, each of the members 27 may be of a length equal to the combined exposed end of the associated support 4 and the exposed end of the associated rod 22, so that when the electrode assembly is positioned as above described, with the disc 25 in contact with the upper ends of the members 27, the opposed ends of the supports 4 and 9 contact with the ends of the rods 22 and 23. With the electrode assembly and the stem thus assembled, the members 27 may be pinched, crimped, welded, or otherwise fastened to the members 4, 22, and the members 9, 23. If desired, before positioning the electrode assembly within the members 27, these latter members may be adjusted by means of a suitable tool or jig so as to insure their being perpendicular to the axis of the press. As an alternative method, the members 27, after being placed over the supports 4 and 9, may be crimped, pinched, or otherwise fastened thereto before inserting the rods 22 and 23, as above described. This latter procedure has the advantage that the members 27, having been properly aligned, are fixedly mounted with respect to the press, consequently the electrode assembly may be merely slid into position with the assurance that it is properly aligned with respect to the press. Furthermore, the members 27 may be chosen of sufficient length so as to provide a predetermined required spacing between the edge of the press and the member 25.

After the electrode assembly has thus been fastened into position by crimping the tubular member 27 around the associated posts 22 and 23, the grid post 21 may be welded to its associated support wire 8. Similarly, the filament tabs 28, 29 may be welded to their associated support wire 6, 7. In like manner, the tab 30 fastened to the cathode sleeve, may be welded to its associated support wire 5. Since the support wires 5, 6, 7 and 8 are provided with right-angled portions at their upper ends, there is assured a proper registry between these support wires and the associated electrode rods or tabs. Consequently, by a single operation of moving the electrode assembly so as to cause the rods 22, 23 to enter the tube 27, there is provided an accurate registry between the support wires 5, 6, 7 and 8 and the various posts and filament tabs of the electrode assembly. It will be seen, therefore, that this greatly simplifies the method of assembling and aligning the various electrodes and permits of the assembly of the electrodes and the stem by automatic machinery. In other words, the electrode assembly may have the various electrodes aligned as a unit, either by hand or by machinery. Similarly, the stem wires may be aligned by hand or machinery, and then the electrode assembly may be positioned on the stem and fastened in place automatically, with the assurance that the electrode assembly is in the proper relation with respect to the press and the various support wires sealed therein.

Instead of making the exposed ends of the support 4 and the post 22 coextensive in length with the associated sleeve 27, this latter sleeve may be made slightly greater in length to provide a space between the opposed ends of the support wires and the post. With this arrangement there is provided a certain amount of resiliency between the press and electrode assembly. It will also be apparent that by the foregoing method of assembly it is possible to vary the space relation between the edge of the press and the electrode assembly without disturbing the alignment thereof with respect to the press. The members 27, having their lower edges in contact with the edge of the press and the upper edges in contact with member 25, tend to reduce the strains on the press due to the vibration of the electrode assembly with relation to the press, since the lower edges of the members 27 bear a large percentage of the twisting or torsional strains and a relatively small percentage of these strains is transmitted to the portions of the support wires that are actually sealed into the press.

Instead of employing tubular members 27 for telescopically aligning the stem and electrode assembly, other equivalent means may be employed. For example, pin and slot arrangements or the like, may be provided, and various other changes and modifications may be made herein without departing from the spirit and scope of the invention.

What I claim is:

1. The combination of a press having support wires therein, an electrode having posts with their ends in alignment with the ends of said wires, an insulator electrode spacer at the lower end of said electrode and tubular coupling means overlying the ends of said wires and posts, said tubular coupling means having one end seated against the edge of the press and the other end seated against said insulator.

2. In combination, a press, an electrode assembly, an insulator disc at the base of said assembly, and a plurality of tubular members positioned between said disc and the edge of said press, and means including said members for supporting said assembly on said press, said tubular members engaging the press at one end and said disc at the other.

HENRY F. CALLAHAN.